June 6, 1944.  G. E. DATH  2,350,547
FRICTION SHOCK ABSORBING MECHANISM
Filed Oct. 24, 1941  2 Sheets-Sheet 1
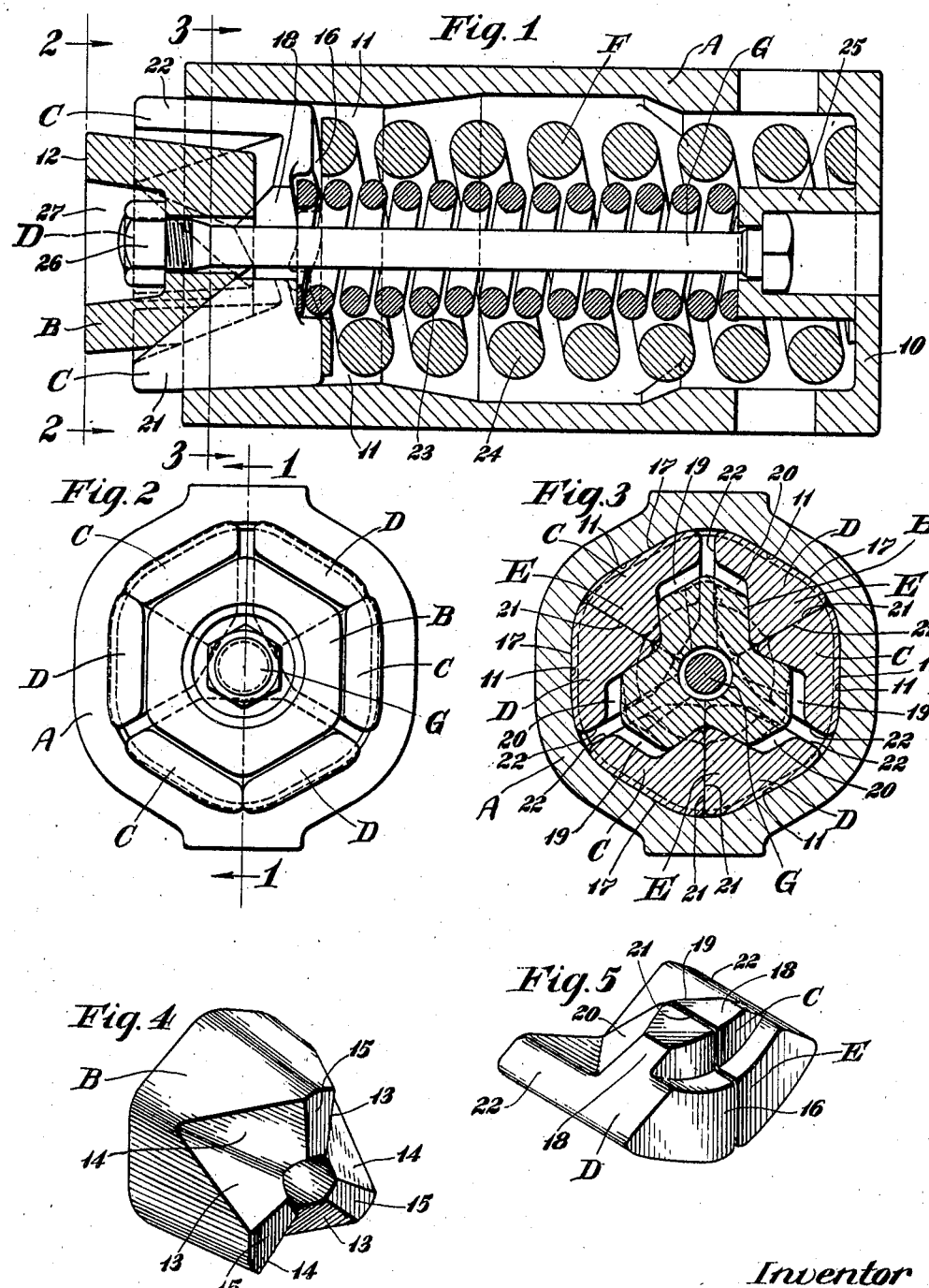
Inventor
George E. Dath
By Henry Fuchs
Atty.

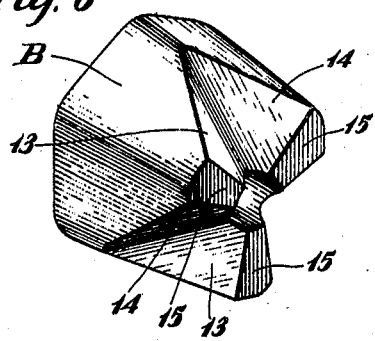
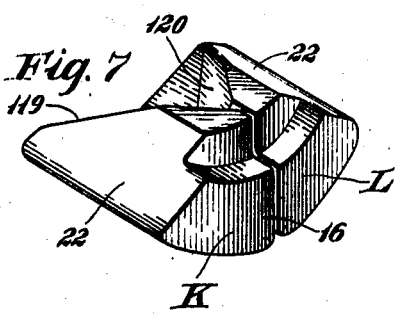
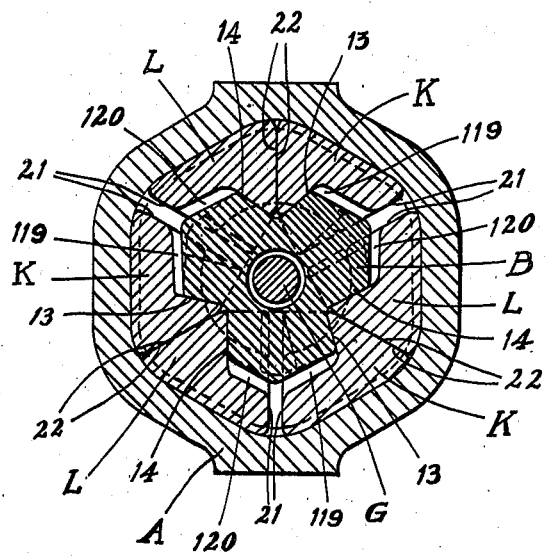

UNITED STATES PATENT OFFICE 2,350,547

FRICTION SHOCK ABSORBING MECHANISM

George E. Dath, Mokena, Ill., assignor to W. H. Miner, Inc., Chicago, Ill., a corporation of Delaware Application October 24, 1941, Serial No. 416,288

4 Claims. (Cl. 213—32)

This invention relates to improvements in friction shock absorbing mechanisms especially adapted for railway cars.

More particularly my invention relates to friction shock absorbing mechanisms wherein are employed a friction casing and a friction clutch cooperating with the casing, movement of the clutch with respect to the casing being spring resisted, and the clutch comprising a pressure transmitting wedge element and cooperating friction shoes or shoe members having friction surfaces slidingly engaging interior friction surfaces of the casing.

The main object of the invention is to provide a friction shock absorbing mechanism comprising a friction casing and a cooperating friction clutch which is spring resisted in its movement with respect to the casing, wherein the clutch includes a central wedge block and a plurality of friction shoes surrounding the block, and the shoe members are arranged in adjacent pairs, and the wedge block wedges the shoe members radially apart and said shoe members of each pair toward each other, the engaging cooperating wedge faces of the wedge and shoe members being arranged at blunt and keen angles to provide differential action between the adjacent shoe members of each of said pairs during compression of the mechanism.

Other objects of the invention will more clearly appear from the description and claims hereinafter following.

In the drawings forming a part of this specification, Figure 1 is a vertical longitudinal sectional view through a friction shock absorbing mechanism embodying my invention, said view corresponding substantially to the line 1—1 of Figure 2. Figure 2 is a front elevational view of Figure 1, looking in the direction of the arrows 2—2 of Figure 1. Figure 3 is a transverse vertical sectional view, corresponding substantially to the line 3—3 of Figure 1. Figure 4 is a perspective view of the wedge block employed in the mechanism shown in Figures 1, 2, and 3. Figure 5 is a detailed perspective view of one of the shoe members employed in the embodiment of the invention shown in Figures 1, 2, and 3. Figures 6 and 7 are views, respectively similar to Figures 4 and 5, illustrating another embodiment of the invention. Fig. 8 is a sectional view similar to Fig. 3 showing the arrangement of the shoes and wedge block of Figs. 6 and 7.

Referring first to the embodiment of the invention illustrated in Figures 1 to 5 inclusive, my improved shock absorbing mechanism comprises broadly a combined friction shell and spring cage in the form of a casing A; a wedge block B; three pairs of keen and blunt friction shoe members C—D, C—D, and C—D, each pair of shoe members C and D together forming, in effect, a split friction shoe E; a main spring resistance F; and a retainer bolt G.

The casing A, which forms the combined friction shell and spring cage, is of substantially hexagonal cross section, having the friction shell section formed at the forward end and the spring cage at the rear end portion thereof. The casing A is closed at the rear end by a transverse wall 10. At the forward end, the casing is open, as shown. The friction shell section, which is at said open end, is provided with six interior, substantially flat, inwardly converging, friction surfaces 11—11—11 which are arranged symmetrically about the longitudinal central axis of the mechanism.

The wedge B is in the form of a block having a transverse outer end face 12 adapted to cooperate in a well-known manner with the usual front follower, not shown, of a railway draft rigging. At its inner end, the wedge block B has three sets of wedge faces 13—14, 13—14, and 13—14, the faces of each set diverging laterally outwardly with respect to a plane radial to the longitudinal central axis of the block and inclined inwardly and rearwardly toward said axis, the face 13 of each set being inclined at an angle which is keener than the angle of the face 14. Between the sets of wedge faces 13—14, 13—14, and 13—14, the wedge block is formed with flat end faces 15, 15, and 15.

The friction shoe members C and D are arranged in sets, each set C—D forming, in effect, a split friction shoe E. At the inner end, the split inner friction shoe E is rounded off on a curve of relatively large radius, as indicated at 16, one-half of said curved surface 16 being formed on the shoe member C and the other half on the shoe member D. On the outer side, each shoe member C and D is provided with a flat friction surface 17 cooperating with one of the friction surfaces 11 of the casing A. On the inner side each shoe member C and D is provided with an enlargement between its ends, indicated by 18. The enlargement 18 of the shoe C has a flat wedge face 19 correspondingly inclined to and cooperating with the corresponding keen wedge face 13 of the block B, and the enlargement of the shoe D has a flat wedge face 20 correspondingly inclined to and cooperating with the corresponding blunt wedge face 14 of said block B. The opposed meeting faces of the members C and D of each split shoe, which are indicated by 21—21, are substantially flat and extend longitudinally of the mechanism. The sets of shoe members C—D, C—D, and C—D respectively engage with the three sets of wedge faces 13—14, 13—14, and 13—14 of the wedge block. As shown most clearly in Figures 2 and 3, the different sets of shoe members 13—14 are normally spaced apart, being maintained in that position by the wedge formation of the block B. The opposed end edge faces of the shoe members of adjacent sets are substantially flat and extend lengthwise of the mechanism. These end edge faces are indicated by 22—22. As will be seen upon reference to Figures 2 and 3, the faces 21—21 and the faces 22—22 of the shoe members C and D lie in planes which are substantially radial to the central longitudinal axis of the mechanism.

The spring resistance F comprises a relatively light inner coil 23 and a relatively heavy outer coil 24, bearing directly on the inner ends of the shoe members C—D, C—D, and C—D of the friction clutch. At the rear end, the outer coil 24 bears directly on the end wall 10 of the casing. The rear end of the inner coil 23 bears on an inwardly extending, hollow boss 25 on the wall 10.

The retainer bolt G has a head at the rear end anchored in the boss 25 and is anchored to the wedge block B at its front end by a nut 26, which is accommodated in an opening 27 provided in said wedge block. The bolt G holds the mechanism assembled and is so adjusted as to maintain the mechanism of uniform overall length and hold the spring resistance F under initial compression.

The operation of my improved shock absorbing mechanism is as follows: Upon being compressed the wedge block B is forced inwardly of the casing spreading the shoe members C—D, C—D, and C—D apart outwardly against the friction surfaces of the casing and squeezing the shoe members of each set against each other and also outwardly against the friction surfaces of the casing, due to the particular arrangement of the cooperating wedge faces of the wedge and shoe members. High frictional resistance is thus created between the friction surfaces of the shoes and the casing during inward movement of the shoes against the resistance of the springs 23 and 24. Due to the keen and blunt arrangement of the wedge faces 13 and 14 of the wedge and the cooperating keen and blunt wedge faces 19 and 20 of the shoe members of each set C and D a differential action is produced, the keen shoe C being advanced inwardly of the mechanism more rapidly than the shoe D, thereby causing the face 21 of the shoe C to slide on the face 21 of the shoe D with resultant increased friction capacity.

When the actuating force is reduced, the expansive action of the spring resistance F returns all of the parts to the normal position shown in Figure 1, outward movement of the clutch comprising the wedge B and the shoe members C—D, C—D, and C—D being arrested by the retainer bolt G limiting outward movement of the wedge B.

Referring next to the embodiment of the invention illustrated in Figures 6, 7 and 8, the construction is substantially the same as that hereinbefore described in connection with Figures 1 to 5 inclusive, with the exception that the cooperating wedge faces of the wedge and shoe members are so arranged that the shoe members of each set will be spread apart circumferentially instead of being squeezed together. The wedge block shown in Figure 6 is substantially the same as the block B hereinbefore described, the same being also indicated by B. The wedge faces of the block B in Figure 6 are also indicated by 13 and 14 and correspond to the faces 13 and 14 described in Figures 1 to 5 inclusive. The shoes shown in Figure 7 which are indicated by K and L correspond to the shoes C and D hereinbefore described with the exception that the wedge faces of the former, which are respectively indicated by 119 and 120 form a valley instead of a rise or projection, the face 119 of the shoe member K being correspondingly inclined to and cooperating with the corresponding keen wedge face 13 at one side of one of the end faces 15 of the block B and the face 120 of the shoe L being correspondingly inclined to and cooperating with the corresponding blunt wedge face 14 at the other side of the same end face 15.

The operation of the friction shock absorbing mechanism embodying the wedge B and the shoe members K and L in Figures 6 and 7 differs from the operation of the mechanism disclosed in Figures 1 to 5 inclusive only in that the shoe members K and L of each set are spread apart instead of being squeezed together as are the shoe members C and D, thus pressing or squeezing together the shoes K and L of adjacent sets and effecting differential action on the opposed outer edge faces 22—22 thereof.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having interior friction surfaces; of a friction clutch slidable in said casing, said clutch including a wedge block and a plurality of friction shoe members surrounding said block, said shoe members being arranged in sets of two adjacent members, said block having a plurality of sets of wedge faces, each set comprising two faces diverging laterally outwardly and rearwardly of the mechanism with respect to a plane embraced between said faces radial to the longitudinal central axis of said mechanism, the angularity of one of said faces being keener than the other, each of said sets of wedge faces of the wedge engaging respectively with the shoe members of one of said sets to squeeze said members together and force the same outwardly against the friction surfaces of the casing; and spring means opposing movement of said clutch inwardly of the casing.

2. In a friction shock absorbing mechanism, the combination with a friction casing having interior friction surfaces; of a central wedge block, said block having a plurality of sets of wedge faces surrounding the longitudinal axis of the mechanism, each set comprising two faces diverging laterally outwardly and rearwardly of the mechanism with respect to a plane embraced between said faces radial to the longitudinal central axis of the mechanism; a plurality of friction shoe members interposed between said wedge block and the friction surfaces of the casing, said shoe members corresponding in number to the wedge faces of said block and each having a wedge face cooperating with one of the faces of said wedge block, whereby adjacent shoe members embraced between each set of wedge faces of the wedge are squeezed together and forced outwardly against the friction surfaces of the casing, said two faces of each set of the wedge being of different angularity with respect to said embraced radial plane to provide for differential sliding action of said embraced shoes with respect to each other; and spring means opposing movement of said shoe members inwardly of the casing.

3. In a friction shock absorbing mechanism, the combination with a friction casing having interior friction surfaces; of a plurality of friction shoe members surrounding the longitudinal central axis of the mechanism, said shoe members being arranged in sets of two members, each of said shoe members having a wedge face on the inner side thereof, the wedge faces of said members of each set being inclined forwardly toward each other and lying in planes diverging laterally outwardly and rearwardly of the mechanism with respect to a plane radial to the longitudinal axis of the mechanism embraced between said members of the set, the angularity of the wedge face of one of said shoe members being greater than the angularity of the face of the other; a wedge block having a plurality of wedge faces, said faces corresponding in number to said shoe members, said faces being correspondingly inclined to and engaging with the faces of said shoe members respectively; and means yieldingly opposing movement of said shoes inwardly of the casing.

4. In a friction shock absorbing mechanism, the combination with a friction casing having interior friction surfaces; of a plurality of friction shoe members surrounding the longitudinal central axis of the mechanism, said shoe members being arranged in sets of two members, each of said shoe members having a wedge face on the inner side thereof, the wedge faces of said members of each set being inclined away from each other forwardly of the mechanism and lying in planes diverging laterally outwardly and forwardly of the mechanism with respect to a plane radial to the longitudinal axis of the mechanism embraced between said members of said set, the angularity of the wedge face of one of said shoe members being greater than the angularity of the face of the other; a wedge block having a plurality of wedge faces, said faces corresponding in number to said shoe members, said faces being correspondingly inclined to and engaging with the faces of said shoe members respectively to force said shoe members apart circumferentially and bring the shoes of adjacent sets in edge to edge contact with each other; and means yieldingly opposing movement of said shoes inwardly of the casing.

GEORGE E. DATH.